Jan. 8, 1963 D. R. LEWIS ET AL Re. 25,320

LOW TEMPERATURE PHOSPHORESCENCE ANALYSIS OF CRUDE OIL

Original Filed April 13, 1959

INVENTORS:
DONALD R. LEWIS
J. VAN STEVENINCK
BY: James Ludowici
THEIR ATTORNEY

United States Patent Office

Re. 25,320
Reissued Jan. 8, 1963

25,320

LOW TEMPERATURE PHOSPHORESCENCE ANALYSIS OF CRUDE OIL

Donald R. Lewis, Houston, Tex., and Johannes van Stevennick, Amsterdam, Netherlands, assignors to Shell Oil Company, a corporation of Delaware Original No. 2,987,620, dated June 6, 1961, Ser. No. 806,011, Apr. 13, 1959. Application for reissue Oct. 18, 1961, Ser. No. 146,053
8 Claims. (Cl. 250—71.5)

Figure 1:
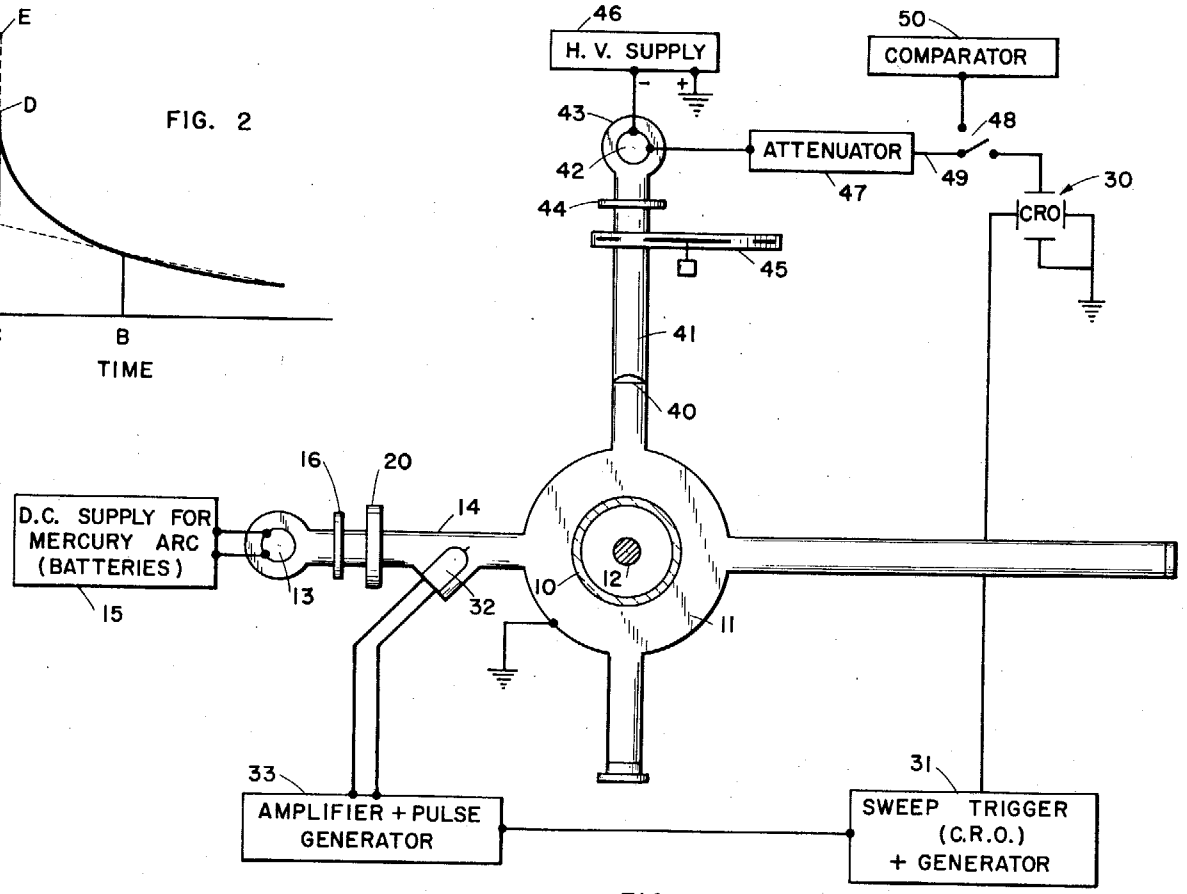

Matter enclosed in heavy brackets [ ] appears in the original patent but forms no part of this reissue specification; matter printed in italics indicates the additions made by reissue.

This invention pertains to a means for differentiating between various crude oil samples and more particularly to a low temperature phosphorescence method for distinguishing between crude oil samples.

In petroleum engineering a suitable method is required which will permit one to distinguish between various crude oil traces which appear in the mud or on cuttings as various hydrocarbon bearing horizons are penetrated during the drilling operation. It is also necessary to distinguish crude oil traces from other oil and organic materials such as lubricating oil, oil base mud and pipe dope which may be introduced into the system in the normal course of drilling. The principal difficulty arises due to the fact that only a small amount of material is usually available and the frequently great similarity of crude oils from different zones in the same field. Of course to be useful any method must be relatively simple and speedily performed with a minimum of equipment.

In the past chromatographic and fluoresence methods have been used in an attempt to differentiate between various crude oil samples. While both of these methods are adequate, they have failed in many instances to distinguish between crude oils which are known to be different in character. Thus the general problem still exists of differentiating between crude oils and especially those having similar characteristics. The crude oils occurring at different horizons within a single well frequently have similar characteristics and are very difficult to distinguish. It is of course necessary to distinguish between the various crudes in order to determine the particular horizon from which the crude oil sample came. The information is also used in plotting the subsurface geological structure of the formation.

Accordingly, the main object of this invention is to provide a low temperature phosphorescence analysis method for differentiating between crude oil samples.

A further object of this invention is to provide a low temperature phosphorescence analysis method for distinguishing between various crude oil samples in which the sample is first mixed with a suitable solvent with the solution then being frozen to provide a solid material which is transparent to both the exciting radiation and the phosphorescence given off by the material.

A still further object of this invention is to provide a low temperature phosphorescence analysis method in which the crude oil sample is first mixed with a suitable solvent, then irradiated with ultraviolet radiation and finally the time required for the phosphorescence intensity to decay to a predetermined level or some other dynamic characteristic such as the average decay rate of the phosphorescence determined in order to distinguish between samples.

The above objects and other advantages of this invention are achieved by mixing a small amount of the crude oil sample in a suitable solvent with the mixture being frozen to provide a solid material. The solvent selected should be one which will provide a solution when frozen which is transparent to both the exciting radiation and the phosphorescence given off by the solid. The use of a solution of crude oil which can be frozen to a rigid solid is necessary to the production of phosphorescence, and lowering the temperature of the system increases the phosphorescence given off by the crude oil. The use of a coolant such as liquefied gases provides a simple means for maintaining the sample at a constant temperature. Because of these advantages it is a simple matter to both irradiate the solid and measure the phosphorescence given off. In order to accurately differentiate between the various crude oils the intensity and wavelength of the exciting radiation which is preferably ultraviolet is maintained constant for a given comparison series. In addition each sample of the series is irradiated for the same length of time so that the results may be easily compared. Various characteristics of the phosphorescence may be measured but it has been found most useful to determine only the following: (1) the intensity of the initial phosphorescence and (2) the time required for the phosphorescence to decay to a predetermined level. In some instances it may be desirable to measure the various phosphorescence parameters such as the length of time the sample is exposed to the exciting radiation is varied.

This invention also provides a simple apparatus for practicing the above method. The apparatus consists of a double-walled vessel, such as a Dewar flask, which is filled with liquid nitrogen to maintain the frozen solution of crude oil and solvent at a constant temperature. A source of accurately controlled ultraviolet radiation including suitable means for varying the length of exposure is used to irradiate the sample. A photomultiplier tube is used to measure the intensity of the phosphorescence given off by the frozen sample. The output of the photomultiplier tube may be displayed or recorded directly as a function of time or may be utilized in a comparing circuit to determine the time required for the phosphorescence to decay to a predetermined level.

Figure 2:
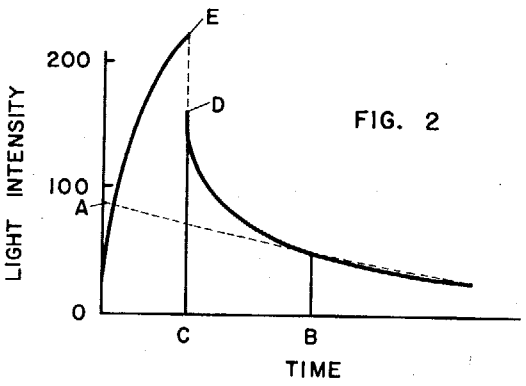

The above objects and advantages of this invention will be more clearly understood from the following detailed description of a preferred embodiment taken in conjunction with the attached drawing in which:

FIGURE 1 is a schematic drawing of the apparatus used in carrying out the method of this invention; and FIGURE 2 is a representative curve showing the increase in luminescence or fluorescence and phosphorescence as the sample is irradiated and the decrease in the phosphorescence after the initial radiation.

Referring now to FIGURE 1, there is shown a double-walled vacuum type vessel 10 mounted in a suitable housing 11. The vacuum vessel 10 is provided with a narrow unsilvered band to permit the transmission of the exciting radiation as well as the phosphorescence given off by the sample through the walls of the vessel. The sample of the crude oil and solvent are placed in a test tube 12 and mounted in the center of the vessel 10 which is then completely filled with liquid nitrogen. The housing 11 of course should be substantially light-tight in order to confine the excited radiation and phosphorescence to the desired paths.

While liquid nitrogen is used to both freeze the crude oil and solvent solution as well as maintain it at a constant temperature, other liquefied gases having a reasonably low boiling point or cooling mixtures such as acetone cooled by Dry Ice may also be used. While many solvents may be used for dissolving the crude oil samples one that has been found particularly effective consists of a mixture of pure diethyl ether, isopentane and ethyl alcohol in the ratio of 5:5:2 by volume. This solvent freezes to a rigid solid at the boiling point of liquid nitrogen and in addition provides a solid which is transparent both to the ultraviolet radiation used for exciting the sample as well as the phosphorescence given off by the crude oil sample. Other solvents are benzene and isopentane and ethyl alcohol although neither are as satisfactory as the solvent given above. As will be explained later the concentration of the crude oil in the solution may have an effect on the intensity of the phosphorescence and accordingly the concentration should be maintained reasonably uniform for all of the samples of any particular series. A simple method for doing this is to compare the color of the various solutions with a standard solution and then adjust the quantity of the crude oil to obtain substantially the same color as a standard solution.

The sample is irradiated by ultraviolet light supplied by a mercury arc lamp 13. The mercury arc lamp is disposed at the end of a tubular arm 14 which projects radially from the housing 11. The mercury arc lamp should be excited from a controlled power supply 15 in order to maintain a substantially constant intensity for the ultraviolet radiation. Likewise, a suitable filter means 16 is disposed in the tubular arm 14 to insure that only radiation of a predetermined wavelength falls on the sample. The filter holder should be designed so that the filters may be easily changed in order that radiation of various wavelengths may be used as desired. In order to control the length of the time which each sample is irradiated a camera type shutter 20 is also disposed in the tubular arm 14 and controlled by any desired type of timing mechanism not shown in FIGURE 1.

The phosphorescence given off by the sample is displayed on a cathode ray oscilloscope 30 whose vertical axis is controlled by the intensity of the phosphorescence while the horizon sweep is controlled by a trigger and time marking mechanism 31. The triggering mechanism 31 is actuated by photo cell 32 whose output is amplified and supplied as a triggering pulse to the trigger circuit 31 by means of an amplifier and pulse generator 33. The photo cell 32 is disposed in the tubular arm 14 and its output is differentiated to produce two pulses. A positive pulse is produced at the start of radiation and a negative pulse when the radiation is interrupted. The first pulse is normally bypassed by means of a biased diode in the amplifier 33 while the second pulse is led to the oscilloscope trigger and time marking circuit 31.

The phosphorescence given off by the sample is passed through a lens 40 which is mounted in a second tubular arm 41 which also projects radially from the housing 11. After the phosphorescence passes through the lens 40 it strikes a photomultiplier tube 42 mounted in a housing 43. A photo shutter mechanism 44 is disposed between the sample and the photomultiplier tube so that the phosphorescence will only strike the photomultiplier tube during the measuring cycle. Of course, it is necessary to synchronize the movement of the shutter 44 with the shutter 20 which controls the radiation from the mercury arc lamp 14. A filter housing 45 is disposed so that various filters may be rotated into position in the tubular member 41 to filter the phosphorescence for preselected wavelengths. Filtering of the phosphorescence is required in difficult cases in order to differentiate between various crude samples.

The photomultiplier tube 42 is connected to a high voltage supply 46 with the output of the photomultiplier being connected to an attenuator 47. The attenuator circuit is designed to supply a signal having sufficient amplitude to utilize substantially the complete vertical height of the cathode ray tube of the oscilloscope 30 regardless of the intensity of the phosphorescence. A switch 48 is disposed in the lead 49 between the attenuator and the cathode ray tube 30 in order to switch the signal from the attenuator 47 between the cathode ray tube 30 and a comparing circuit 50. The comparing circuit 50 is designed so that one may compare the intensity of the phosphorescence in the sample with a predetermined level of phosphorescence in order to determine the time required for the phosphorescence to decay to the preselected level. A standard camera (not shown) is mounted on the oscilloscope 30 to photograph the trace thereon in order that the trace may be analyzed.

From the above description it can be seen that a suitable apparatus has been provided for both irradiating the sample and measuring the intensity of the phosphorescence given off by the sample. Both the length of time the sample is irradiated as well as the wavelength of the radiation can be accurately controlled by the above apparatus. Likewise, it is possible to both display the character of the phosphorescence on the cathode ray oscilloscope 30 and determine the time required for its intensity to fall to a predetermined value through the use of the comparing circuit 50. Thus various characteristics of the phosphorescence of the various samples may be accurately determined so that one may distinguish between the samples.

As explained above, the use of a frozen sample provides a means for obtaining the phosphorescence of the sample as well as a useful means for maintaining the sample at a constant temperature. While various liquids may be used for dissolving the crude oil samples the diethyl ether, isopentane and ethyl alcohol is very satisfactory since it gives uniform results and forms glassy homogeneous solid which is both transparent to the ultraviolet radiation as well as the phosphorescence given off by the sample.

Referring now to FIGURE 2, there is shown a typical curve for a crude oil sample which may be recorded by photographing the trace on the cathode ray oscilloscope 30. The initial portion of the curve is determined by the phosphorescence given off by the sample while it is being irradiated by the ultraviolet ray source. After the source is cut off at a point E the intensity of the phosphorescence falls very rapidly to a certain value D. The rapid fall in the phosphorescence is due to the rapid decay of the fluorescence of the sample which ceases when the radiation is interrupted. The remainder of the curve quickly assumes a substantially linear character determined by the phosphorescence of the sample.

The linear portion of the curve can be projected back to the vertical axis to give a value which determines the initial intensity of the phosphorescence. The initial value of the phosphorescence as well as the slope of the linear portion of the curve varies for each crude oil sample. Thus using these two characteristics it is possible to distinguish between the various samples.

The slope of the decay curve is relatively independent of the concentration of the crude in the solution and may be used to characterize the majority of crude oils. The fractional saturation with varying excitation time is another characteristic which is substantially concentration independent and thus may be used to characterize crude oils. While both of the above characteristics of crude oil are relatively independent of the concentration of the crude oil in the solvent it is still advisable to maintain the concentrations of any one series substantially uniform by the color matching technique described above. In extreme cases where it is impossible to identify a particular crude by any concentration independent characteristic the color matching technique will be sufficient for maintaining the solutions uniform.

While but one apapratus has been described for performing the method of this invention many additional apparatus will occur to those skilled in the art. As explained, other solvents may be used as well as other means for freezing the sample solution. The important features of this invention are the use of low temperatures to give uniform results so that various characteristics of the phosphorescence of the samples may be used to characterize the samples. By using the method of this invention many crude oil samples which were impossible to distinguish by prior methods have been easily distinguished and identified as coming from certain horizons within a drilled well. Thus one is able to accurately determine the horizons penetrated by the wellbore and greatly increase the chances of discovering producible petroleum reservoirs.

We claim as our invention:

1. A method for distinguishing between various [crude oils] [having similar characteristics] *organic materials having generally similar physical and chemical properties and capable of undergoing low temperature phosphorescence* comprising: dissolving an amount of each [crude oil] *organic material* in a solvent, said solvent being capable of freezing to a homogeneous solid which is transparent to both ultraviolet light and the phosphorescence emitted by the sample; lowering the temperature of each sample solvent mixture below the freezing point of the solvent; exposing each frozen mixture to ultraviolet radiation of known wavelength for a known length of time; measuring the phosphorescence emitted by each frozen sample for a known length of time after said exposure; and distinguishing between said [crudes] *organic materials* by the differences in the measured phosphorescence of each sample.

2. A method for identifying an unkown [crude oil] *organic material having physical and chemical properties similar to other organic materials and capable of undergoing low temperature phosphorescence* comprising: dissolving a predetermined amount of the [crude oil] *organic material* in a solvent; said solvent being capable of freezing to a homogeneous solid which is transparent to both ultraviolet light and the phosphorescence emitted by the [crude oil] *organic material*; lowering the temperature of the [crude oil] *organic material* solvent mixture below the freezing point of the solvent; exposing the frozen mixture to ultraviolet light of known wavelength; measuring the phosphorescence emitted by the frozen mixture for a known length of time after said exposure; and identifying the [crude oil] *organic material* by comparing the measured phosphorescence of the unknown [crude] *organic material* with the phosphorescence of a known [crude] *organic material.*

3. A method of distinguishing between various [crude oils] [having similar characteristics] *organic materials having generally similar physical and chemical properties and capable of undergoing low temperature phosphorescence* comprising: dissolving a predetermined amount of each [crude oil] *organic material* in a predetermined amount of a solvent consisting of diethyl ether, isopentane and ethyl alcohol; lowering the temperature of each of said [crude oil] solvent [mixtures] *mixture* to substantially the temperature of liquid nitrogen; exposing each of the frozen samples to ultraviolet light of known wavelength for a known length of time; measuring the phosphorescence of each frozen sample for a known length of time after said exposure; and distinguishing between the [crude oil samples] *organic materials* by the differences in said measured phosphorescence.

4. A method for distinguishing between various crude oils having similar characteristics comprising: dissolving an amount of each crude oil in a solvent consisting of diethyl ether, isopentane and ethyl alcohol; matching the color of each crude oil solvent solution with the color of a crude oil solvent sample of known concentration; lowering the temperature of each of said crude oil solvent mixtures to substantially the temperature of liquid nitrogen; exposing each of the frozen samples to ultraviolet light of known wavelength for a known length of time; measuring the rate of decrease in the phosphorescence of each sample and distinguishing between the crude oil samples by the differences in said measured rate of decrease in phosphorescence.

5. A method for distinguishing between various crude oils having similar characteristics comprising: dissolving an amount of each crude oil in a solvent consisting of diethyl ether, isopentane and ethyl alcohol; lowering the temperature of each of said crude oil solvent mixtures to substantially the temperature of liquid nitrogen; exposing each of the frozen samples to ultraviolet light for varying lengths of time; measuring the phosphorescence given off by each sample for each exposure time; and distinguishing between said samples on the basis of the difference in measured phosphorescence for each exposure time.

6. Apparatus for determining the phosphorescence of a [crude oil] sample *of an organic material having physical and chemical properties similar to other organic materials and capable of undergoing low temperature phosphorescence when* dissolved in a frozen solvent comprising: support means including cooling means for holding a sample of the [crude oil] *organic material* and solvent and maintaining the solution frozen; a source of ultraviolet light, transmission means for exposing the sample in said supoprt means to said ultraviolet light; timing means for controlling the time of said exposure; detecting means for detecting the phosphorescence emitted by the sample after the exposure; and measuring means for determining the quantity of phosphorescence detected.

7. Apparatus for determining the phosphorescence of a [crude oil] sample *of an organic material having physical and chemical properties similar to other organic materials and capable of undergoing low temperature phosphorescence when* dissolved in a solvent comprising: a double walled container disposed to receive a member containing a frozen solution of the solvent and [crude oil] *organic material*, the space between the double walls of said container being evacuated and both said container and member being transparent to ultraviolet ray energy and the phosphorescence emitted by the [crude oil] sample *of the organic material*, said container in addition being filled with a liquid having a boiling point below the meltng point of said solution; a source of ultraviolet light, transmission means for exposing the sample in said member to said ultraviolet light; timing means for controlling the time of said exposure; photomultiplier means for detecting the phosphorescence of said sample after said exposure; means for timing the detecting to coincide with the interruption of the ultraviolet light and measuring means for indicating the change in said phosphorescence with respect to time.

8. A method for identifying crude oil comprising: dissolving a predetermined amount of the crude oil in a solvent; said solvent being capable of freezing to a homogeneous solid which is transparent to both ultraviolet light and the phosphorescence emitted by the crude oil; lowering the temperature of the crude oil solvent mixture below the freezing point of the solvent; exposing the frozen mixture to ultraviolet light of known wavelength; and measuring characteristics of the phosphorescence emitted by the frozen mixture after said exposure.

References Cited in the file of this patent or the original patent

| | | |
|---|---|---|
| 2,337,465 | Heigl | Dec. 21, 1943 |
| 2,361,261 | Campbell | Oct. 24, 1944 |
| 2,392,620 | Sparks | Jan. 8, 1946 |
| 2,403,631 | Brown | July 9, 1946 |
| 2,431,487 | Larsen | Nov. 25, 1947 |